US007926993B2

(12) United States Patent
Smajser et al.

(10) Patent No.: US 7,926,993 B2
(45) Date of Patent: Apr. 19, 2011

(54) PROJECTOR UNIT

(75) Inventors: Petr Smajser, Novy Jicin (CZ); Libor Losak, Koprivnice (CZ); Jiri Harabis, Koprivnice (CZ); Tomas Jurasek, Pribor (CZ)

(73) Assignee: Visteon Global Technologies, Inc., Van Buren Township, MI (US)

(*) Notice: Subject to any disclaimer, the term of this patent is extended or adjusted under 35 U.S.C. 154(b) by 337 days.

(21) Appl. No.: 12/341,200

(22) Filed: Dec. 22, 2008

(65) Prior Publication Data

US 2009/0190368 A1 Jul. 30, 2009

(30) Foreign Application Priority Data

Dec. 27, 2007 (CZ) .................................... 2007-905

(51) Int. Cl.
*B60Q 1/00* (2006.01)

(52) U.S. Cl. ........ 362/539; 362/282; 362/284; 362/507; 362/276

(58) Field of Classification Search .................. 362/538, 362/539, 284, 282, 324, 276
See application file for complete search history.

(56) References Cited

U.S. PATENT DOCUMENTS

| | | | | |
|---|---|---|---|---|
| 3,046,864 | A * | 7/1962 | Batterman et al. | 355/101 |
| 5,339,226 | A | 8/1994 | Ishikawa | |
| 5,343,371 | A | 8/1994 | Kobayashi et al. | |
| 7,364,331 | B2 * | 4/2008 | Tajima | 362/509 |
| 2007/0153238 | A1 * | 7/2007 | Takeuchi et al. | 353/97 |

FOREIGN PATENT DOCUMENTS

| | | |
|---|---|---|
| DE | 199 09 413 A1 | 9/2000 |
| EP | 0 690 261 A1 | 1/1996 |

* cited by examiner

*Primary Examiner* — Ali Alavi

(74) *Attorney, Agent, or Firm* — Fraser Clemens Martin & Miller LLC; J. Douglas Miller

(57) ABSTRACT

A projector unit is provided with a mechanism for changing the spatial distribution of a light beam. The projector unit includes a housing, an action element having a revolving shaft, a first diaphragm for cropping the light beam, wherein the first diaphragm is fixedly coupled to the shaft of the action element, a second diaphragm for cropping the light beam, wherein the second diaphragm is rotatingly coupled to the shaft of the action element, a first biasing element disposed between the second diaphragm and the housing, wherein the first biasing element regulates a positioning of the second diaphragm relative to the housing, and a second biasing element disposed between the first diaphragm and the second diaphragm, wherein the second biasing element regulates a spacing between the first biasing element and the second biasing element.

20 Claims, 6 Drawing Sheets

PROJECTOR UNIT

FIELD OF THE INVENTION

The invention relates to vehicle headlights. More particularly, the invention is directed to a projector unit including a mechanism for changing the spatial distribution of a light beam.

BACKGROUND OF THE INVENTION

A modern solution used in particular for discharge type headlights is the combination of a distance light pattern and a dipped light pattern by means of a mechanism which is placed inside a projector lighting unit. As such, the mechanism provides a means for the movement of an optical element of the projector lighting unit, thereby providing both the distance light pattern and the dipped light pattern Accordingly, the dipped light pattern and the distance light pattern may be generated by a single source having an uninterrupted discharge. A presently customary mechanism is known as a bifunctional (bi-xenon) element. However, other multifunctional mechanisms are already in the stage of experimentation, startup production, or series production.

Most of the conventional multifunctional mechanisms make use of a revolving diaphragm to change and control a light cropping. For example, the following patents describe the use of a diaphragm which can revolve about a transverse axis: DE 199 09 413 A1 of the Hella firm; U.S. Pat. Nos. 5,339,226 and 5,343,371 of the Koito firm; and EP 0 690 261 A1 of the Valeo firm.

Additionally, multifunctional mechanisms have to be reliable in operation under extreme conditions (temperature, vibration) within the headlight.

It would be desirable to develop a projector unit including a mechanism for changing a shape of a light cropping element and, thus, the spatial distribution of a light beam, wherein the projector unit provides reliable operation under temperature change and vibrations.

SUMMARY OF THE INVENTION

Concordant and consistent with the present invention, a projector unit including a mechanism for changing a shape of a light cropping element and, thus, the spatial distribution of a light beam, wherein the projector unit provides reliable operation under temperature change and vibrations, has surprisingly been discovered.

In one embodiment, a projector unit for changing a spatial distribution of a light beam comprises: an action element having a revolving shaft; a first diaphragm for cropping the light beam, wherein the first diaphragm is fixedly coupled to the shaft of the action element; and a second diaphragm for cropping the light beam, wherein the second diaphragm is rotatingly coupled to the shaft of the action element.

In another embodiment, a projector unit for changing a spatial distribution of a light beam comprises: a housing; an action element having a revolving shaft; a first diaphragm for cropping the light beam, wherein the first diaphragm is fixedly coupled to the shaft of the action element; a second diaphragm for cropping the light beam, wherein the second diaphragm is rotatingly coupled to the shaft of the action element; and a first biasing element disposed between the second diaphragm and the housing for regulating a positioning of the second diaphragm relative to the housing.

In yet another embodiment, a projector unit for changing a spatial distribution of a light beam comprises: a housing; an action element having a revolving shaft; a first diaphragm for cropping the light beam, wherein the first diaphragm is fixedly coupled to the shaft of the action element; a second diaphragm for cropping the light beam, wherein the second diaphragm is rotatingly coupled to the shaft of the action element; a first biasing element disposed between the second diaphragm and the housing, wherein the first biasing element regulates a positioning of the second diaphragm relative to the housing; and a second biasing element disposed between the first diaphragm and the second diaphragm, wherein the second biasing element regulates a spacing between the first biasing element and the second biasing element.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

Figure 1:
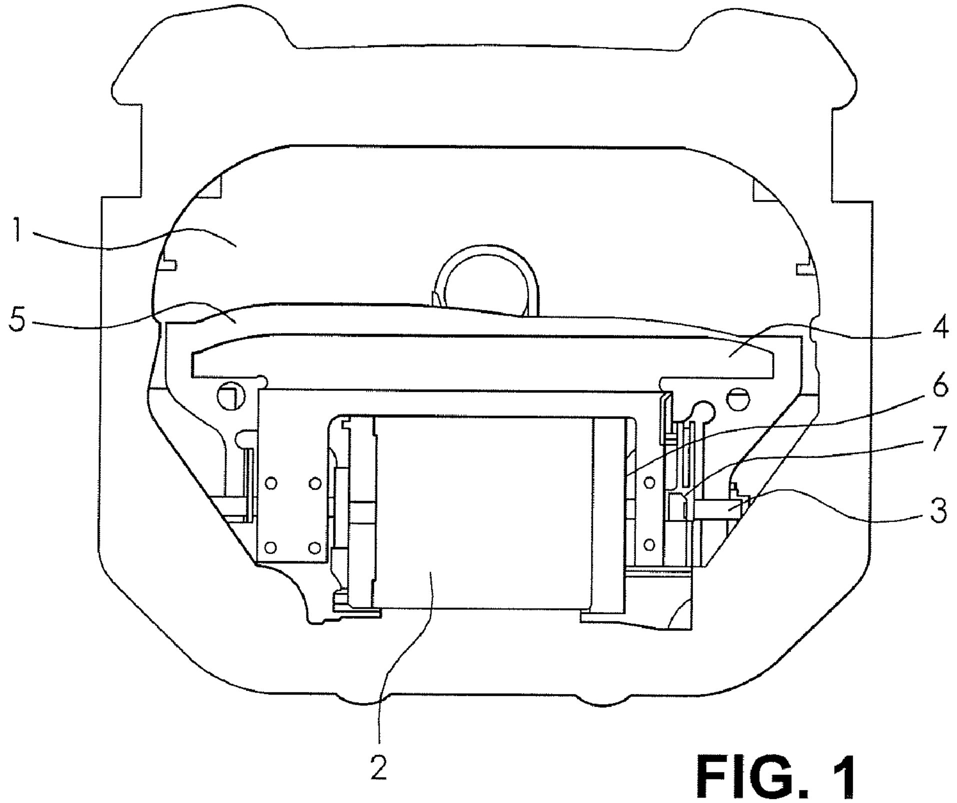
FIG. 1 is a front elevational view of a projector unit according to the present invention, the projector unit shown in a passive position for producing a dipped light pattern.
Figure 2:
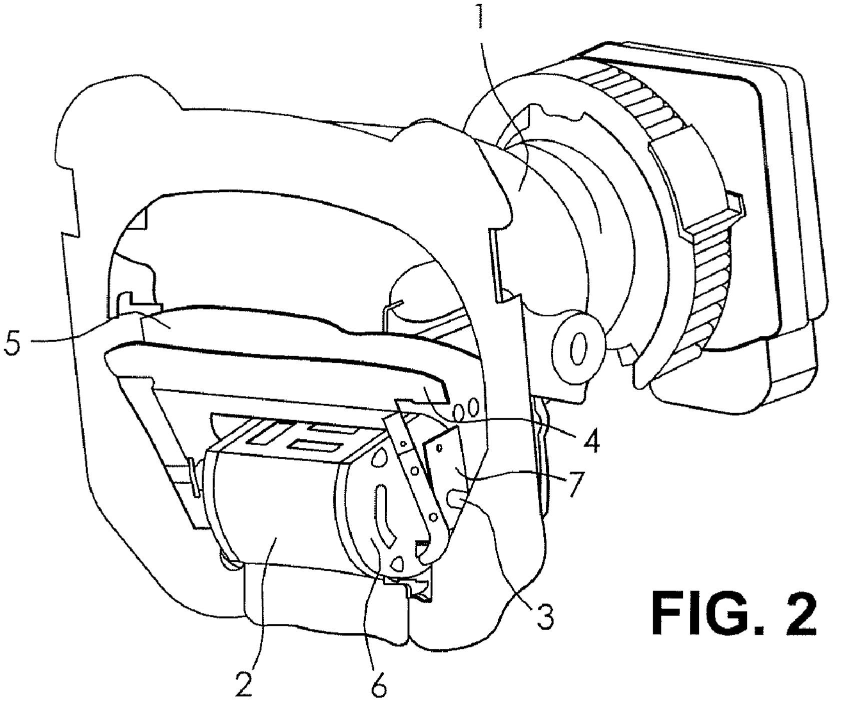
FIG. 2 is a perspective view of the projector unit of FIG. 1, shown in a passive position for producing a dipped light pattern.
Figure 3:
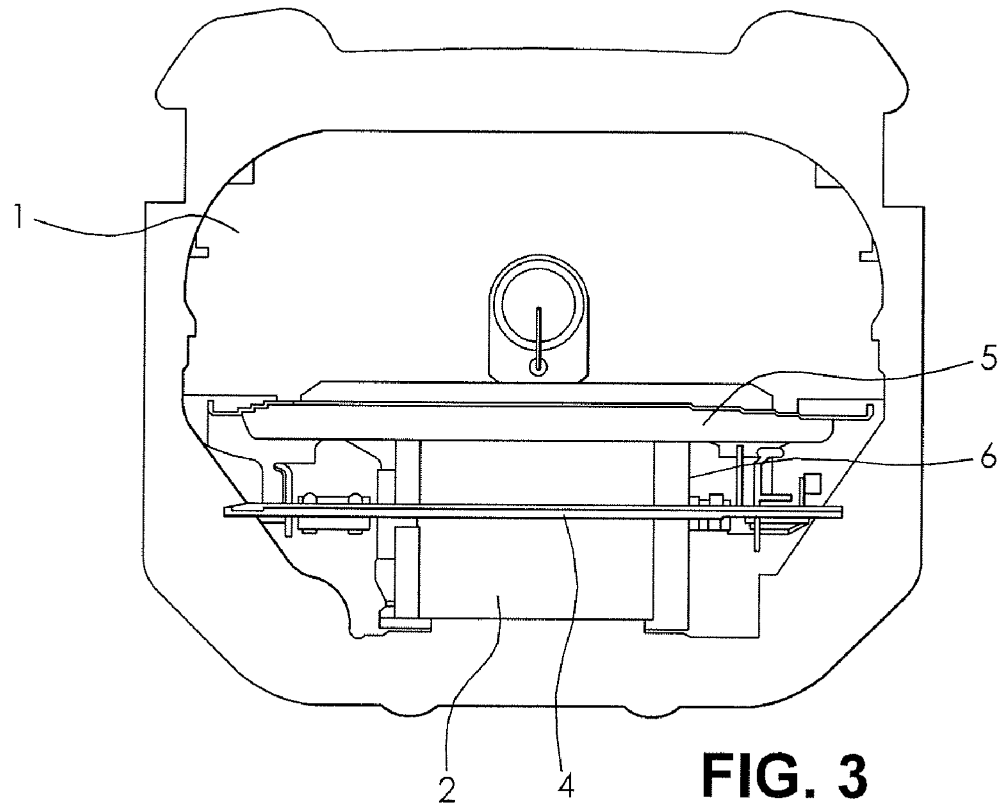
FIG. 3 is a front elevational view of the projector unit of FIG. 1 shown in a normal polarity position for producing a distance light pattern.
Figure 4:
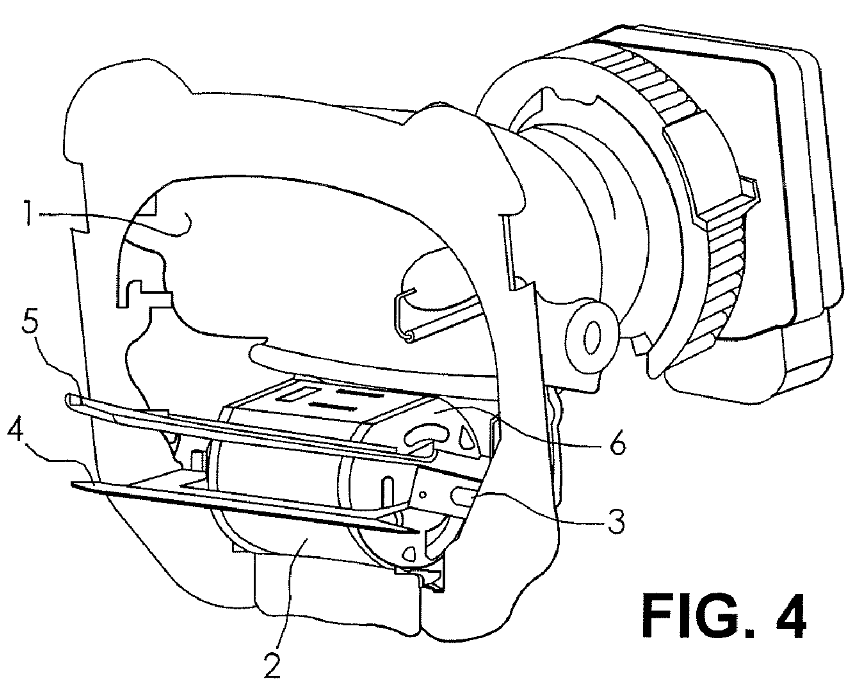
FIG. 4 is a perspective view of the projector unit of FIG. 1, shown in a normal polarity position for producing a distance light pattern.
Figure 5:
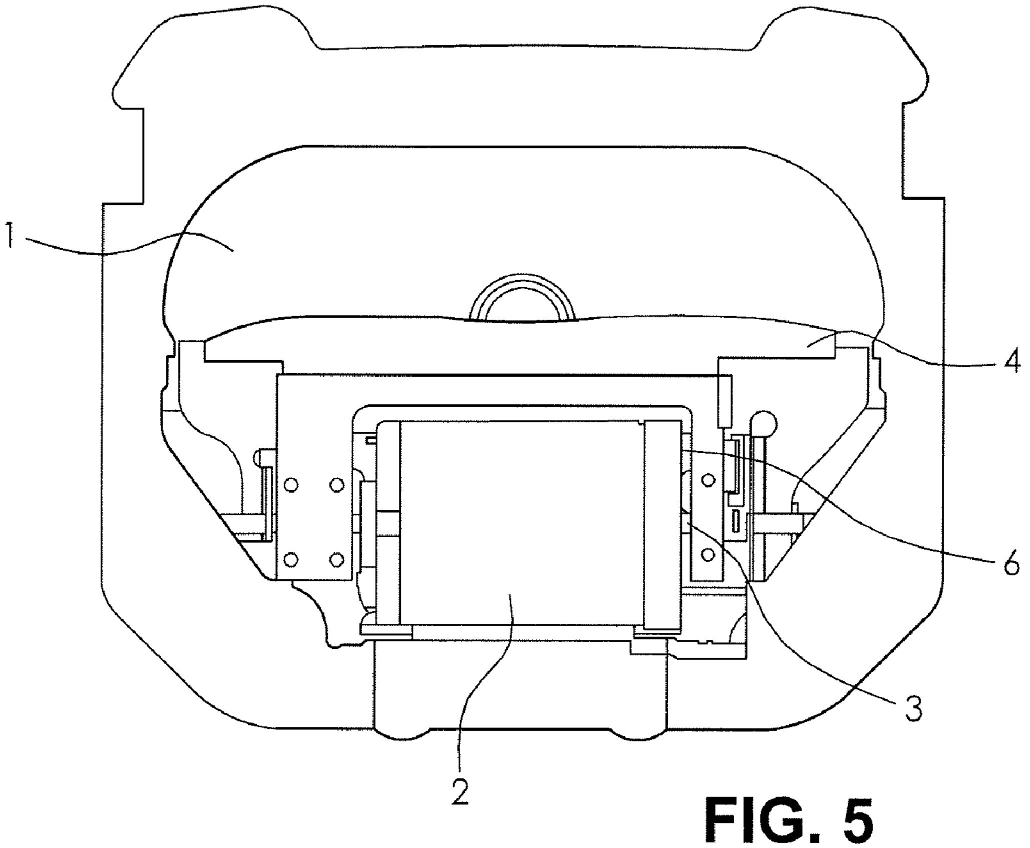
FIG. 5 is a front elevational view of a projector unit according to another embodiment of the present invention, the projector unit shown in a reversed polarity position for producing a fog light pattern.
Figure 6:
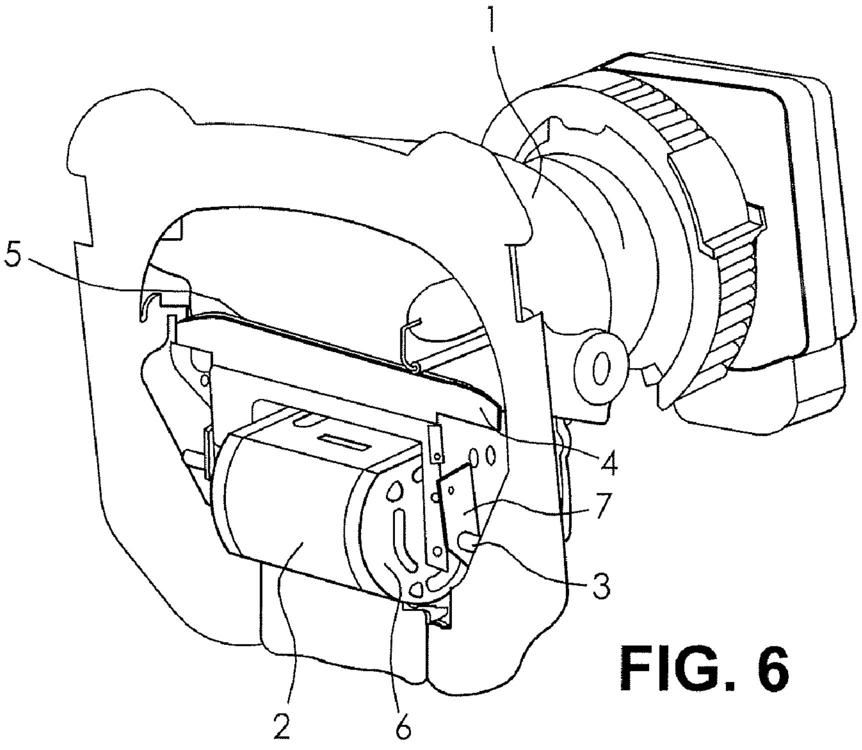
FIG. 6 is a perspective view of the projector unit of FIG. 5, shown in a reversed polarity position for producing a fog light pattern.
Figure 7:
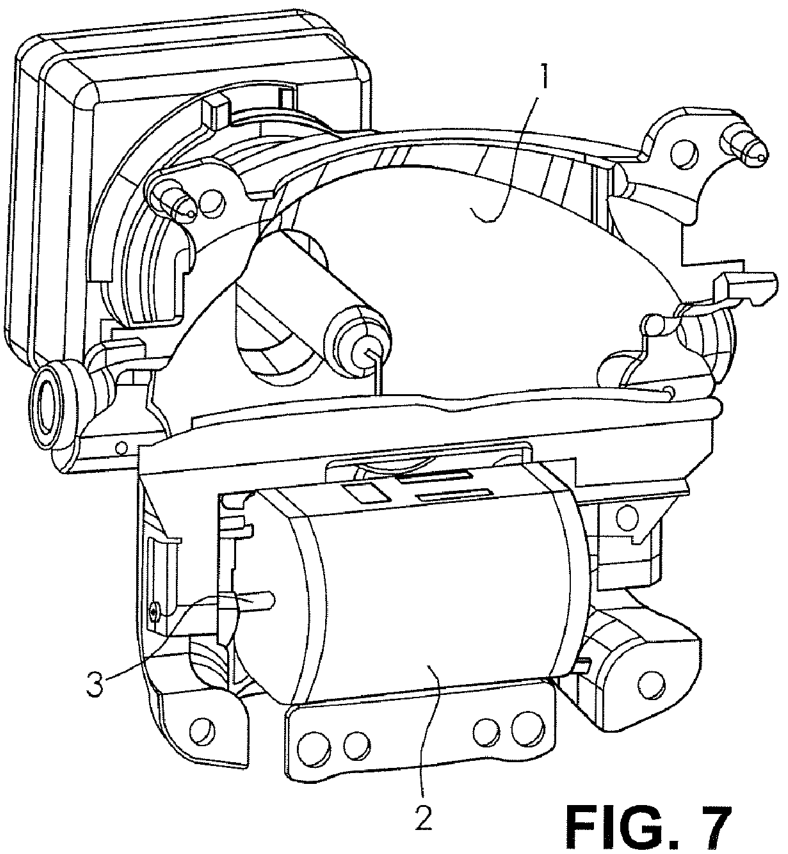
FIG. 7 is a perspective view of a projector unit according to another embodiment of the present invention, the projector unit shown in a passive position for producing a dipped light pattern.
Figure 8:
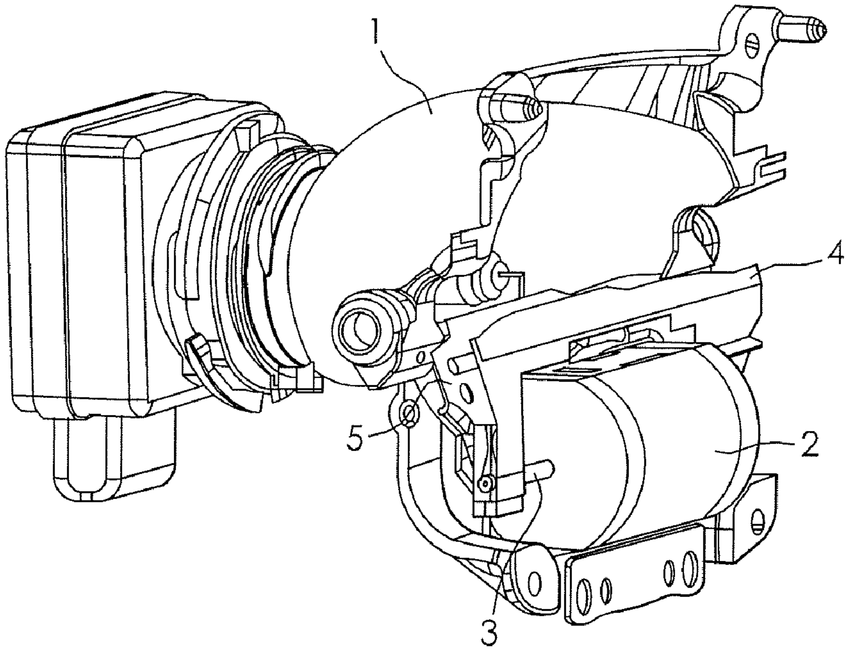
FIG. 8 is a perspective view of the projector unit of FIG. 7 shown in a reversed polarity position for producing a wet road light pattern.
Figure 9:
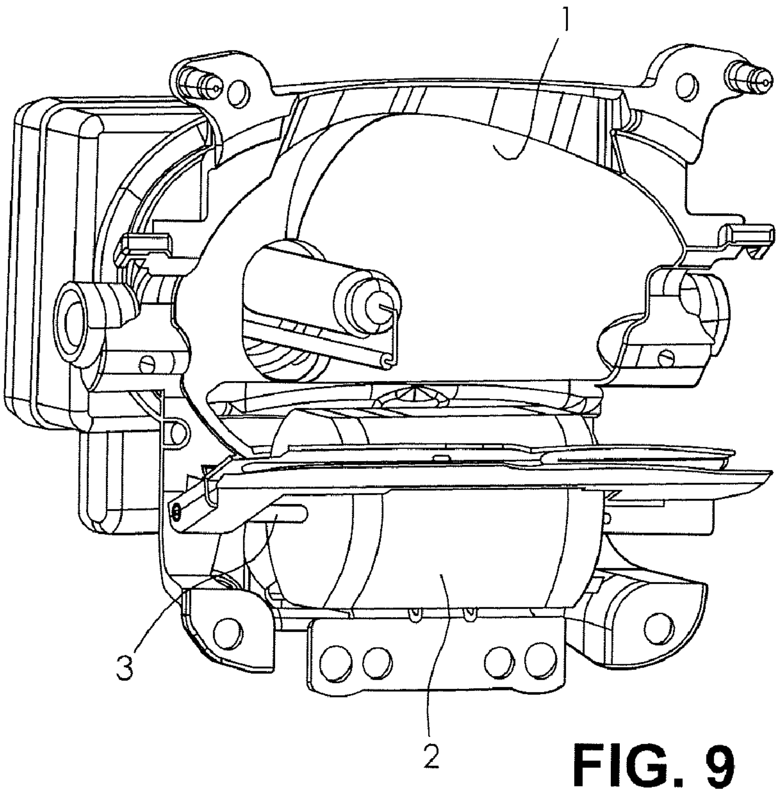
FIG. 9 is a perspective view of the projector unit of FIG. 7 shown in a normal polarity position for producing a distance light pattern.
Figure 10:
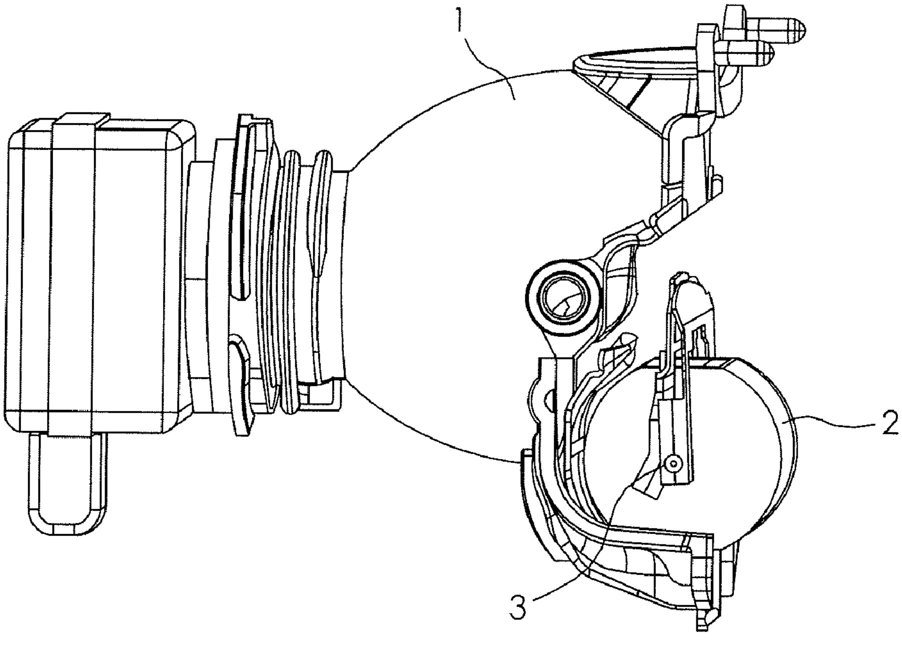
FIG. 10 is a side elevational view of the projector unit of FIG. 7, shown in the passive position for producing the dipped light pattern.
Figure 11:
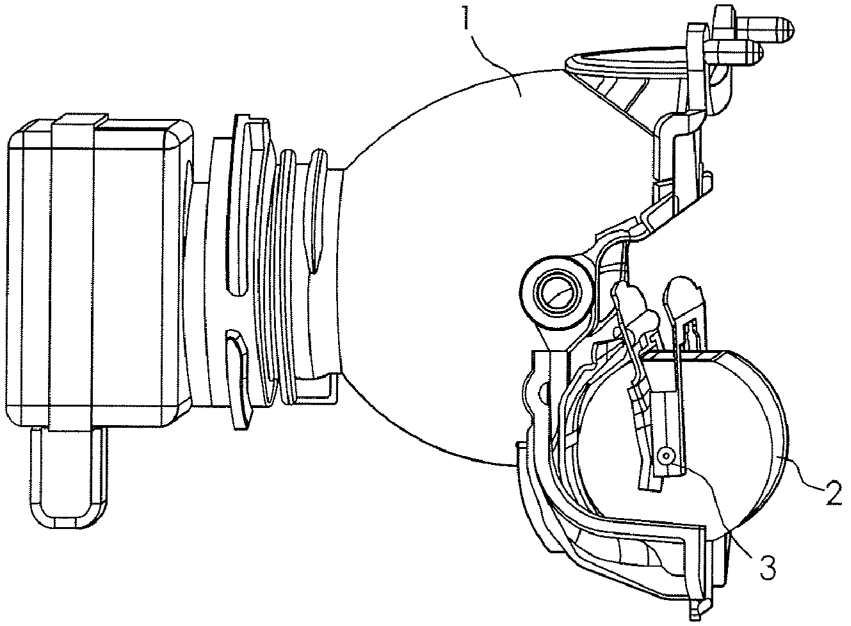
FIG. 11 is a side elevational view of the projector unit of FIG. 7, shown in a reverse polarity position for producing the wet road light pattern.
Figure 12:
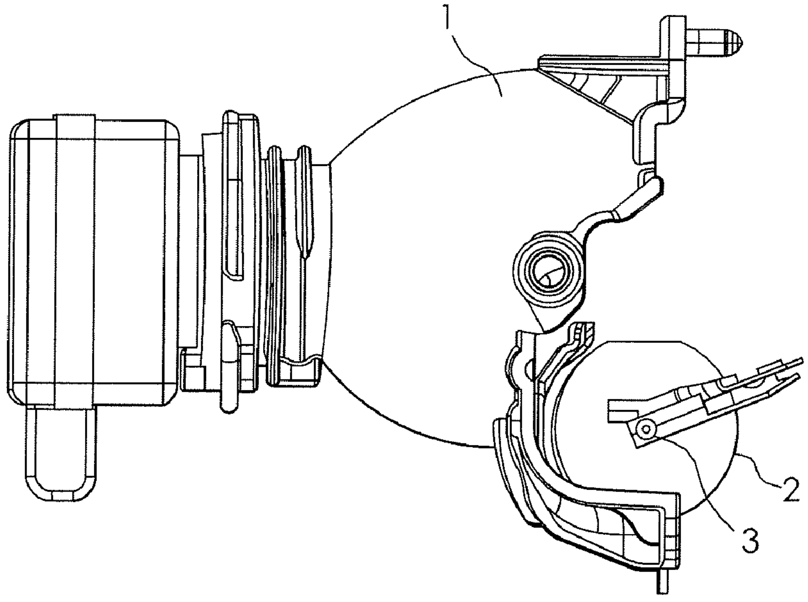
FIG. 12 is a side elevational view of the projector unit of FIG. 7, shown in a normal polarity position for producing the distance light pattern.

The following detailed description and appended drawings describe and illustrate various embodiments of the invention. The description and drawings serve to enable one skilled in the art to make and use the invention, and are not intended to limit the scope of the invention in any manner.

A mechanism, installed in a projector unit 1 of a headlight, includes an action element 2 having a shaft 3, a first diaphragm 4, and a second diaphragm 5. The first diaphragm 4 is securely coupled to the shaft 3, while the second diaphragm 5 is rotationally couple to the shaft 3. In certain embodiments, the action element 2 is an electric motor. However, other devices may be used to control the rotational motion of the shaft 3 and the diaphragms 4, 5. It is understood that the diaphragms 4, 5 may have any shape and size to provide a variety of light distribution patterns.

The mechanism further includes a first reversible biasing element 6 and a second reversible biasing element 7. The first biasing element 6 is disposed between the second diaphragm 5 and the projector unit 1. As such, the first biasing element 6 forms a connection between the second diaphragm 5 and the projector unit 1, wherein a force created by the first biasing element 6 returns the second diaphragm 5 to a pre-determined default position. As a non-limiting example, the default position is a position for generating a dipped light pattern. Other light patterns may be used such as distance light patterns, fog light patterns, and light patterns for wet road conditions, for example. In certain embodiments, the first biasing element 6 is formed from a spring. However, other reversible biasing elements may be used such as magnets, for example. It is understood that in certain embodiments, the first biasing element 6 is braced against the second diaphragm 5 and not the first diaphragm 4. In certain embodiments, the first biasing element 6 may be selectively toggled between a passive state, a normal polarity state, and a reversed polarity state to control a positioning of the second diaphragm 5 relative to a housing of the projector unit 1.

The second biasing element 7 is disposed between the first diaphragm 4 and the second diaphragm 5. As such, the second biasing element 7 regulates a spacing between the diaphragms 4 and 5. In certain embodiments, the second biasing element 7 is formed from a spring. However, other reversible biasing elements may be used such as magnets, for example. In certain embodiments, the second biasing element 7 may be selectively toggled between a passive state, a normal polarity state, and a reversed polarity state to control a spacing of the diaphragms 4, 5 relative to each other.

In use, a light source emits a light beam. The action element 2 controls a positioning of the first diaphragm 4 to provide a pre-determined light cropping of the emitted light beam. Additionally, the biasing devices 6, 7 cooperate to control a positioning of the second diaphragm 5 relative to the first diaphragm 4 and a housing of the projector unit 1. As such, the light beam is cropped based upon the combined pattern created by the arrangement of the diaphragms 4, 5. It is understood that various designs and arrangements of the diaphragms 4, 5 may provide a range of resultant light beam patterns. For example, where a reverse polarity of the biasing elements 6, 7 is switched on, the projector unit 1 may provide a beam arrangement of the light beam for use as a fog light. Conversely, a normal polarity of the biasing elements 6, 7 may provide an arrangement of the resultant light beam to obtain a distance light pattern. However, it is understood that the positioning of each of the first diaphragm 4 and the second diaphragm 5 relative to the projector unit 1, the light source, and each other, provides the resultant lighting pattern.

The projector unit 1 according to the present invention provides a means for changing the shape of a cropping element and, thus, a resultant light distribution. Additionally, the projector unit 1 including the mechanism provides reliable operation under temperature change and vibrations.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A projector unit for changing a spatial distribution of a light beam comprising:

an action element having a revolving shaft;

a first diaphragm for cropping the light beam, wherein the first diaphragm is fixedly coupled to the shaft of the action element; and a second diaphragm for cropping the light beam, wherein the second diaphragm is rotatingly coupled to the shaft of the action element.

2. The projector unit according to claim 1, wherein the action element is an electric motor.

3. The projector unit according to claim 1, further comprising a housing and a first biasing element, wherein the first biasing element is disposed between the second diaphragm and the housing for controlling a positioning of the second diaphragm.

4. The projector unit according to claim 3, wherein the first biasing element is a reversible element.

5. The projector unit according to claim 3, wherein the first biasing element is at least one of a spring and a magnet.

6. The projector unit according to claim 1, further comprising a second biasing element disposed between the first diaphragm and the second diaphragm for controlling relative positioning between the first diaphragm and the second diaphragm.

7. The projector unit according to claim 6, wherein the second biasing element is a reversible element.

8. The projector unit according to claim 6, wherein the second biasing element is at least one of a spring and a magnet.

9. A projector unit for changing a spatial distribution of a light beam comprising:

a housing;

an action element having a revolving shaft;

a first diaphragm for cropping the light beam, wherein the first diaphragm is fixedly coupled to the shaft of the action element;

a second diaphragm for cropping the light beam, wherein the second diaphragm is rotatingly coupled to the shaft of the action element; and a first biasing element disposed between the second diaphragm and the housing for regulating a positioning of the second diaphragm relative to the housing.

10. The projector unit according to claim 9, wherein the action element is an electric motor.

11. The projector unit according to claim 9, wherein the first biasing element is a reversible element.

12. The projector unit according to claim 9, wherein the first biasing element is at least one of a magnet and a spring.

13. The projector unit according to claim 9, further comprising a second biasing element disposed between the first diaphragm and the second diaphragm for controlling relative positioning between the first diaphragm and the second diaphragm.

14. The projector unit according to claim 13, wherein the second biasing element is a reversible element.

15. The projector unit according to claim 13, wherein the second biasing element is at least one of a magnet and a spring.

16. A projector unit for changing a spatial distribution of a light beam comprising:

a housing;

an action element having a revolving shaft;

a first diaphragm for cropping the light beam, wherein the first diaphragm is fixedly coupled to the shaft of the action element;

a second diaphragm for cropping the light beam, wherein the second diaphragm is rotatingly coupled to the shaft of the action element;

a first biasing element disposed between the second diaphragm and the housing, wherein the first biasing element regulates a positioning of the second diaphragm relative to the housing; and a second biasing element disposed between the first diaphragm and the second diaphragm, wherein the second biasing element regulates a spacing between the first biasing element and the second biasing element.

17. The projector unit according to claim 16, wherein the action element is an electric motor.

18. The projector unit according to claim 16, wherein the first biasing element is at least one of a magnet and a spring.

19. The projector unit according to claim 16, wherein the second biasing element is a reversible element.

20. The projector unit according to claim 16, wherein the second biasing element is at least one of a magnet and a spring.

* * * * *